(12) United States Patent
Tokuhara

(10) Patent No.: US 8,732,736 B2
(45) Date of Patent: May 20, 2014

(54) BILLING ELECTRONIC ADVERTISEMENT SYSTEM

(76) Inventor: Tsunemi Tokuhara, Kodaira (JP)

( * ) Notice: Subject to any disclaimer, the term of this patent is extended or adjusted under 35 U.S.C. 154(b) by 0 days.

(21) Appl. No.: 13/805,131

(22) PCT Filed: Sep. 21, 2010

(86) PCT No.: PCT/JP2010/066278
§ 371 (c)(1), (2), (4) Date: Dec. 18, 2012

(87) PCT Pub. No.: WO2012/039015
PCT Pub. Date: Mar. 29, 2012

(65) Prior Publication Data
US 2013/0104157 A1    Apr. 25, 2013

(51) Int. Cl.
*H04H 60/33* (2008.01)
*H04H 60/56* (2008.01)

(52) U.S. Cl.
USPC .................................. 725/12; 725/10; 725/22

(58) Field of Classification Search
USPC .......................................... 725/5, 10, 12, 22
See application file for complete search history.

(56) References Cited

U.S. PATENT DOCUMENTS

2003/0028873 A1* 2/2003 Lemmons ........................ 725/36
2010/0070987 A1* 3/2010 Amento et al. ................. 725/10

FOREIGN PATENT DOCUMENTS

| JP | 2001-326928 | 11/2001 |
| JP | 2002-288509 | 10/2002 |
| JP | 2002-354446 | 12/2002 |
| JP | 2007-18218  | 1/2007  |
| JP | 2009-140238 | 6/2009  |
| JP | 2010-39095  | 2/2010  |

OTHER PUBLICATIONS

International Search Report issued Nov. 22, 2010 in International (PCT) Application No. PCT/JP2010/066278.

* cited by examiner

*Primary Examiner* — Hunter B Lonsberry
(74) *Attorney, Agent, or Firm* — Wenderoth, Lind & Ponack, L.L.P.

(57) ABSTRACT

An electronic advertisement system is provided by which, when an advertisement effect that corresponds to billing conditions is not obtained, an advertiser is free from an obligation to pay advertisement fee so that the advertiser can run an advertisement without having an economic risk. An electronic advertisement sending side computer has a billing tag addition means for adding, to electronic advertisement data, a tag composed of information describing billing conditions. A receiving side computer includes: a display unit that outputs, as output data, video and audio of received electronic advertisement data; and an electronic device that acquires the circumstance around the display unit as input data. A program of the receiving side computer has an input video analysis means that determines whether billing conditions for outputted electronic advertisement data are achieved or not by analyzing input data from the electronic device. When the billing conditions are achieved, the program generates billing charge data.

11 Claims, 15 Drawing Sheets

BILLING ELECTRONIC ADVERTISEMENT SYSTEM

TECHNICAL FIELD

The present invention relates to an electronic advertisement system configured so that an advertisement charge is charged to a sponsor only when a predetermined advertisement effect desired by the sponsor is confirmed.

BACKGROUND ART

Conventionally, electronic signboards have been known to send, via the Internet, various pieces of video and character information. Such an electronic signboard has been known that provides different advertisement to a customer based on the analysis result of an image of the face of the customer taken by the camera (see Non-patent Publication 1 for example). An information processing apparatus also has been known that includes a video analysis means to extract the expression of a person taken by a digital camera to quantify the expression (see Patent Publication 1 for example). A program technique has been also known that uses a computer program to generate, based on video data, a two-dimensional or three-dimensional object to control the generated object (see Patent Publication 2 for example).

PRIOR ART PUBLICATION

Patent Publication

Patent Publication 1: Patent Publication No. 355823
Patent Publication 2: Japanese Laid-Open Publication No. 2002-366973

Non-Patent Publication

Non-patent Publication 1: Asahi Shimbun 13th edition, P2

SUMMARY OF THE INVENTION

Problem to be Solved by the Invention

A conventional electronic advertisement system is generally configured so that an advertising client requests an advertisement agency to broadcast advertisement video and audio data and an advertisement publication fee based on a contract between the client and the agency is paid from the former to the latter. In this case, the advertising client must pay the advertisement publication fee regardless of whether the advertisement was effective of not. Furthermore, the advertising client cannot easily confirm what kind of effect was achieved by the advertisement, thus causing a significant economic risk. It is an objective of the present invention to solve the above disadvantage.

Means for Solving the Problem

In order to achieve the above objective, the present invention includes: an electronic advertisement sending-side computer including an electronic advertisement preparation program; a receiving side computer that includes a program for processing electronic advertisement data generated by the electronic advertisement sending side computer and that outputs, via a display unit, the video and audio of the electronic advertisement data processed by the computer as output data; and an electronic device that inputs the circumstance around the display unit as input data to the receiving side computer. The program provided in the electronic advertisement sending side computer has: a billing tag addition means for adding, to the electronic advertisement data, a tag including information describing billing conditions. The program provided in the receiving side computer has: an input video analysis means that determines whether the billing conditions for the outputted electronic advertisement data are achieved or not by analyzing the input data of the electronic device. When the billing conditions are achieved, billing charge data to be processed by the electronic advertisement sending side computer is generated.

According to the present invention, the electronic advertisement sending side computer is connected to the receiving side computer via a network.

According to the present invention, the electronic advertisement data generated by the electronic advertisement sending side computer is supplied via a recording medium to the receiving side computer. The billing charge data generated by the receiving side computer is supplied via the recording medium to the electronic advertisement sending side computer.

According to the present invention, the billing conditions include, as contents thereof, at least one of numerical values of the number of passersby turned to an advertisement output screen and the number of passersby smiled at the advertisement output screen.

According to the present invention, the electronic advertisement data includes: a unique word; authentication data composed of an ID code of a transmitter and an ID code of a recipient; billing guarantee data including a billing amount and billing conditions; and advertisement video and audio data including a main scenario and a plurality of pieces of unit data.

According to the present invention, the input video analysis means has an information analysis function for preparing electronic information by recognizing, based on the video information of the electronic device, the direction of faces or facial expressions of persons surrounding the display unit.

According to the present invention, the program provided in the receiving side computer reconfigures, based on the analysis result of the input video analysis means, the scenario of the electronic advertisement data so as to achieve the billing conditions and outputs the reconfigured video and audio through the display unit.

According to the present invention, when the program provided in the electronic advertisement sending side computer receives the billing charge data, the program validates whether the billing conditions are achieved or not and, when the billing conditions are achieved, calculates a billing charge.

According to the present invention, the program provided in the electronic advertisement sending side computer generates an output object based on the output data, generates an input object based on the input data and, when the input object does not change in a direction satisfying the billing conditions, reconfigures a scene including the output object and uses the changed scene to guide the input object in a direction satisfying the billing conditions.

According to the present invention, when the input object is guided by the output object in the direction satisfying the billing conditions, the scene is recorded as corrected output data and the corrected output data is used to reconfigure the scene.

Effect of the Invention

According to the present invention, the advertising client sends billing tag-attached advertisement video and audio data to the advertisement publisher side so that, only when the billing condition is achieved, the advertisement publication fee is paid. Thus, an effect is provided according to which a risk can be avoided to cause the payment of the advertisement charge for advertisement having no advertisement effect.

EMBODIMENT FOR CARRYING OUT THE INVENTION

The following section will describe in detail the configuration of the present invention with reference to the attached drawings.

Figure 3:
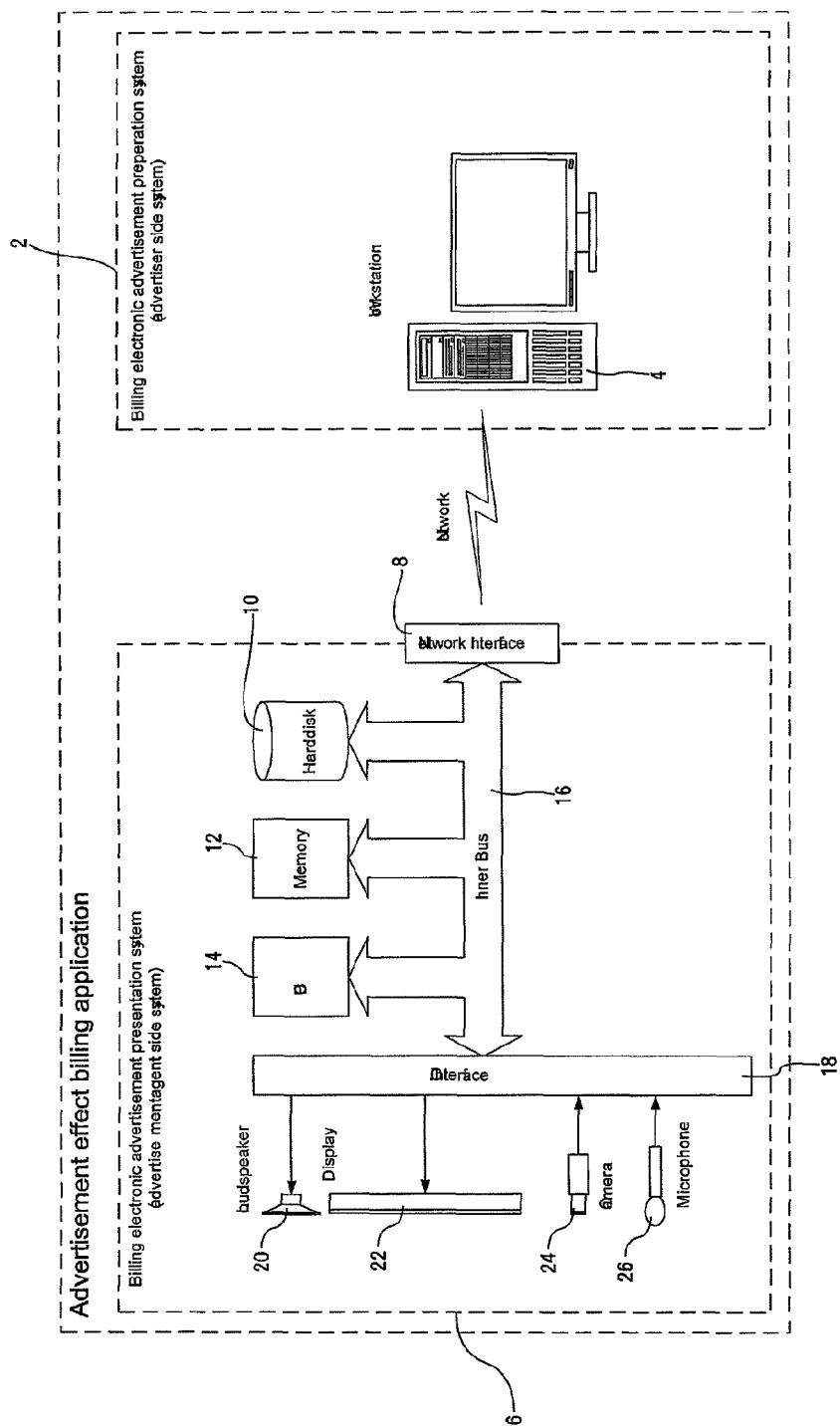
FIG. 3 is a block diagram illustrating the present invention.

FIG. 3 illustrates the hardware configuration of this system.

A billing electronic advertisement preparation system 2, which is an advertising client-side (or sender-side) system, is composed of a work station 4. A billing electronic advertisement notification system 6, which is an advertisement agency-side (receiver-side) system, is composed of: a computer composed of a network interface 8, a hard disk 10, a memory 12, a CPU 14, internal bus 16, and an I/O interface 18; and a speaker 20, a video display unit 22, a moving image/still image photographing digital camera 24, and a microphone 26 that are connected to the computer via the I/O interface 18. The camera 24 photographs a passersby 204 together with the scenery in front of the display unit 22. The system 6 receives the digital output from the camera 24 to generate the person object (input object) of the passersby 204 (which will be described later). The output from the microphone 26 can be used, depending on a billing condition (which will be described later), as an audio signal of the passersby for example. The respective computers of the billing electronic advertisement preparation system 2 and the billing electronic advertisement notification system 6 are mutually connected via a network.

Figure 4:
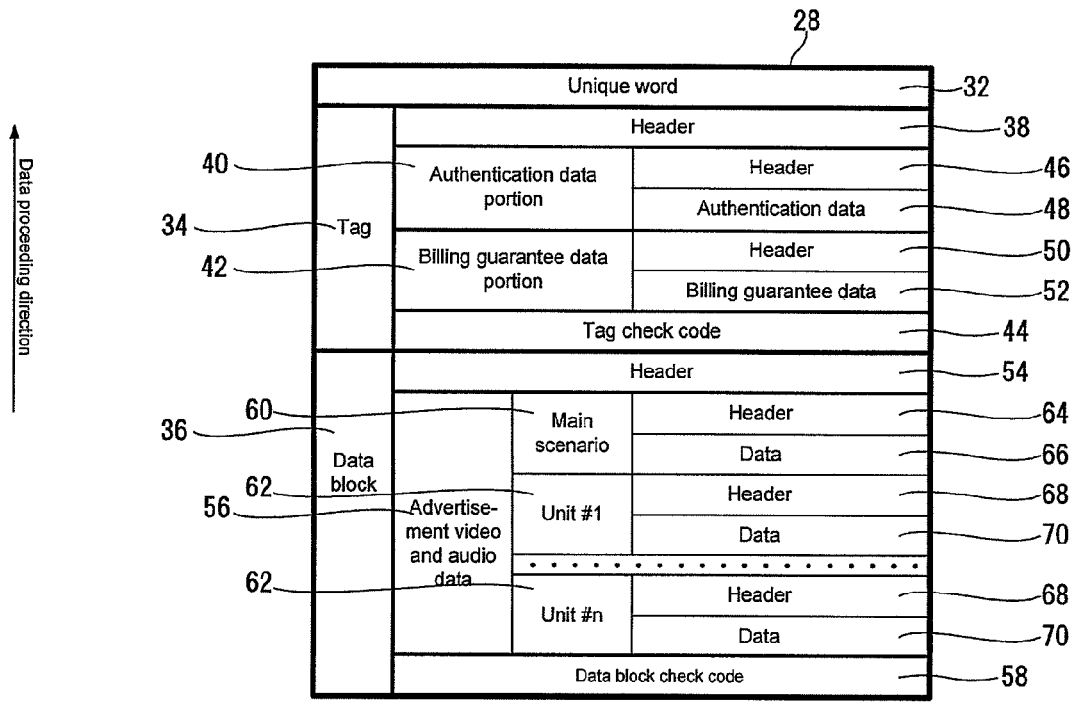
FIG. 4 illustrates the present invention.
Figure 5:
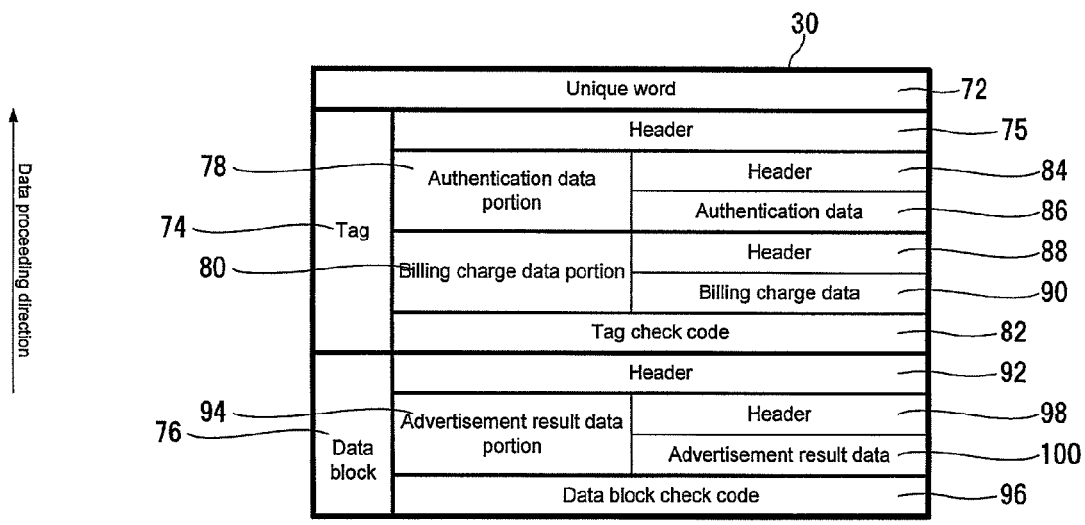
FIG. 5 illustrates the present invention.

FIG. 4 and FIG. 5 illustrate the format of the billing tag-attached data used for this system. FIG. 4 illustrates the tag-attached data 28 sent from the advertising client (sender) to the advertisement agency (receiver). FIG. 5 illustrates the tag-attached data 30 sent from the advertisement agency (sender) to the advertising client (receiver). The data 28 is composed of a unique word 32, a tag 34, and a data block 36. The tag 34 is composed of a header 38, an authentication data portion 40, a billing guarantee data portion 42, and a tag check code 44. The authentication data portion 40 is composed of a header 46 and authentication data 48. The billing guarantee data portion 42 is composed of a header 50 and billing guarantee data 52.

The data block 36 is composed of: a header 54, advertisement video and audio data 56, and a data block check code 58. The advertisement video and audio data 56 is composed of: a main scenario 60; and many pieces of unit data 62. The main scenario 60 is composed of a header 64 and data 66. Each unit of the unit data 62 is composed of a header 68 and data 70. The unique word 32 is composed of an identification synchronization code for the billing tag-attached data 28. The header 38 shows the number of bytes of the tag 34. The authentication data 48 is composed of an advertising client ID code (sender) and an advertisement agency ID code (receiver).

The header 50 shows the number of bytes of the billing guarantee data 52. The billing guarantee data 52 is composed of the serial number, the billing amount, and the billing condition of the billing tag-attached data 28. The billing condition is a condition to obtain an advertisement effect desired by the advertising client including, for example, the number of the passersby turned to the advertisement or the number of the passersby smiled at the advertisement. The tag check code 44 is composed of an error detection correction code for the tag header 38, the authentication data portion 40, and the billing guarantee data portion 42. The header 54 is composed of the number of bytes of the data block 36. The header 64 is composed of the number of bytes of the main scenario 60. The data 66 is composed of an execution procedure of the unit data 62 and the information regarding the link to the unit data 62.

The header 68 shows the number of bytes of each unit data 62. The data 70 is composed of the video and audio data of the unit data 62. The data block check code 58 is composed of an error detection correction code for the header 54 of the data block 36 and the advertisement video data 56. In FIG. 5, the tag-attached data 30 is composed of a unique word 72, a tag 74, and a data block 76. The tag 74 is composed of a header 75, authentication data 78, a billing charge data portion 80, and a tag check code 82. The authentication data portion 78 is composed of a header 84 and authentication data 86. The billing charge data portion 80 is composed of a header 88 and billing charge data 90. The data block 76 is composed of a header 92, an advertisement result data portion 94, and a data block check code 96.

Figure 6:
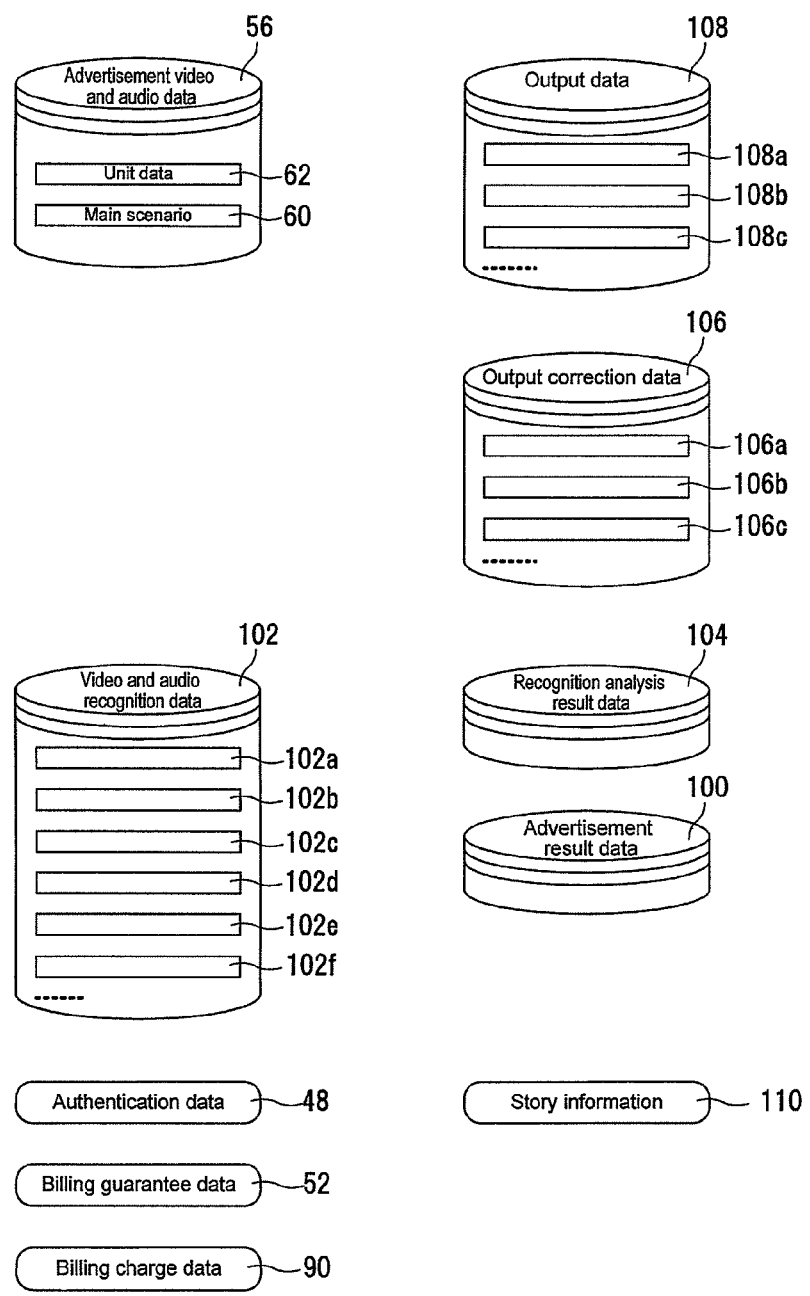
FIG. 6 illustrates the present invention.

The advertisement result data portion 94 is composed of a header 98 and advertisement result data 100. The unique word 72 is composed of the identification synchronization code of the billing tag-attached data 30. The header 75 shows the number of bytes of the tag 74. The header 84 shows the number of bytes of authentication data 86. The authentication data 86 is composed of an advertisement agency ID code (sender) and an advertising client ID code (receiver). The header 88 shows the number of bytes of the billing charge data 90. The billing charge data 90 is composed of the serial number, the billing amount, and the billing condition of the billing tag-attached data 28. The tag check code 82 is composed of an error detection correction code of the header 75 of the tag 74, the authentication data portion 78 and the billing charge data portion 80. The header 92 shows the number of bytes of the data block 76. The header 98 shows the number of bytes of the advertisement result data 100. The advertisement result data 100 is composed of a recognition result, an advertisement effect, and a log, respectively. The data block check code 96 is composed of an error detection correction code of the header of the data block 76 and the advertisement result data portion 94. FIG. 6 illustrates the structure of data used in this system.

Video and audio recognition data 102 shown in FIG. 6 has the data structure as shown below.

Background data 102*a* is video data obtained from a camera input other than video information considered to the one showing a portrait and is used to extract the background by a statistics processing for example.

Person model data 102*b* shows a person model having a universal feature amount obtained by subjecting many person images to a statistics processing for example.

Face model data 102*c* shows a face model having a universal feature amount obtained by subjecting the face images of many persons to a statistics processing for example.

Eye/pupil model data 102*d* shows an eye/pupil model having a universal feature amount obtained by subjecting the eye/pupil images of many persons to a statistics processing for example.

Smiling face model data 102*e* shows a smiling face model having a universal feature amount obtained by subjecting the smiling face images of many persons to a statistics processing for example.

Face object data 102*f* shows various pieces of information for the object recognition based on each face tracking processing unit. The face object data 102*f* is composed, for example, of the face object data of the passerby A and the face object data of the passerby B. The face object data of the passerby A is the object recognition history and recognition information for the face tracking processing of the passerby A. The face object data of the passerby B is the object recognition history and recognition information for the face tracking processing of the passerby B.

In the above description, the term "feature amount" means a numerical value of the feature of the shape of the person, face, eye, or smiling face and shows the relative position, shape, mutual relation, or a change speed for example of the respective parts of the face of the person (e.g., winkle, eyelid, pupil, lip, or teeth). Recognition analysis result data 104 has the data structure as shown below.
Recognition analysis result data serial No.: 00000001
Project code: PrjctCd00-01
Electronic advertisement medium No.: EastStreet97
Date: 20100808-23:00.00-20100808-23:59.59
Number of smiling faces: XXXX
Number of persons turned to the advertisement: yyyy Advertisement result data 100 has the data structure as shown below.
Advertisement result data:
Billing tag-attached data serial No. KTD0001
Electronic advertisement medium No.: EastStreet97
Date: 20100808-23:00.00-20100808-23:59.59
Number of smiling faces: XXXX
Number of persons turned to the advertisement: yyyy Output correction data 106 has the respective blocks 106*a*, 106*b*, and 106*c* that have the data structure as shown below.
Block 106*a*:
Output correction data serial No.: 00000001
Project code: PrjctCd00-01
Scenario code: ABCD-0001
Scenario script link information: corrected video and audio information for stimulation
Parent link information: 00000001
Child link information: 00000003
Video and audio data
Block 106*b*:
Output correction data serial No.: 00000002
Project code: PrjctCd00-01
Scenario code: ABCD-0001
Scenario script link information: Corrected video and audio information for stimulation
Parent link information: 00000001
Child link information: 00000003
Video and audio data
Block 106*c*:
Output correction data serial No. 00000003
Project code: PrjctCd00-01
Scenario code: ABCD-0001
Scenario script link information: corrected video and audio information for stimulation
Parent link information: 00000001
Child link information: None
Video and audio data Output data 108 has the respective blocks 108*a*, 108*b*, and 108*c* that have the data structure as shown below.
Block 108*a*:
Output data serial No.: T00000001
Preparation process ID: PC00001
Video and audio ring address information: 700000002, 700000003
Video and audio data
Block 108*b*:
Output data serial No.: 700000002
Preparation process ID: PC00001
Video and audio ring address information: 700000003
Video and audio data mode: MPEG4
Video and audio data
Block 108*c*:
Output data serial No.: 700000003
Preparation process ID: PC00001
Video and audio link address information: None
Video and audio data mode: MPEG4
Video and audio data:

The authentication data 48 has the data structure as shown below.
Authentication data:
Advertising client ID code and advertisement agency ID code
The billing guarantee data (embodiment) 52 has the data structure as shown below.
Billing tag-attached data serial No.: KTD0001
Billing amount: ¥ 200,000
Billing condition:
Smiling face determination threshold value: smile
Number of smiling faces as a billing threshold value: N
A threshold value for determining a turning direction: Entire screen area
A billing threshold value of the number of persons turned to the advertisement: M
The billing charge data (embodiment) 90 has the data structure as shown below.
Billing tag-attached data serial No.: KTD0001
Billing amount: ¥ 200,000
Billing condition:
Smiling face determination threshold value: smile
Number of smiling faces as a billing threshold value: N A threshold value for determining a turning direction: Entire screen area
A billing threshold value of the number of persons turned to the advertisement: M
Determination result:
Story information (embodiment) 110 has the data structure as shown below.
Story information:
One baby in a room is looking for the mother.
The baby cries. Anxious music. Crying voice. The mother comes. The baby turns to the mother. The mother whispers to the baby. The baby smiles with laughter. Peaceful music. A sales copy starts. (This process is repeated.)
The advertisement video and audio data (embodiment) 56 has the data structure as shown below.
Data of the unit data 62:
Video and audio unit #-#n
U#100: Room
U#200: Mother, face of the mother talking to the baby, voice
U#201: Mother, smiling face
U#250: Baby, the face looking for the mother
U#251: Baby, the face finding the mother
U#300: Baby, the crying face
U#310: Baby, the smiling face
U#350: Baby, the crying voice
U#351: Baby, the crying voice (medium)
U#352: Baby, the crying voice (large)
U#360: Baby, laughter
U#400: Sales copy, characters AAAA
U#410: Sales copy, audio aaaa
U#500: Background music (BGM) (anxious sound)
U#510: Background music (BGM) (peaceful sound)
Data of main scenario 60:
Main scenario:
The number of stages/story: 4
Story number: 16
Stages to be billed: all stages
Stage time: 1 minute, 1 minute, 1 minute, 1 minute
First stage: (U#100+U#250)+U#500
Second stage: (U#300+U#350)+U#500
Third stage (1): (U#200)+(U#300+U#350)
Third stage (2): (U#200)+(U#310+U#360)
Fourth stage (1): (U#310+U#360+U#510)
Fourth stage (2): (U#310+U#360+U#510)+(U#400+U#410)
Stimulation scene (with an increase from a low stimulation level to a high stimulation level): U#350→U#351→U#352

Figure 1:
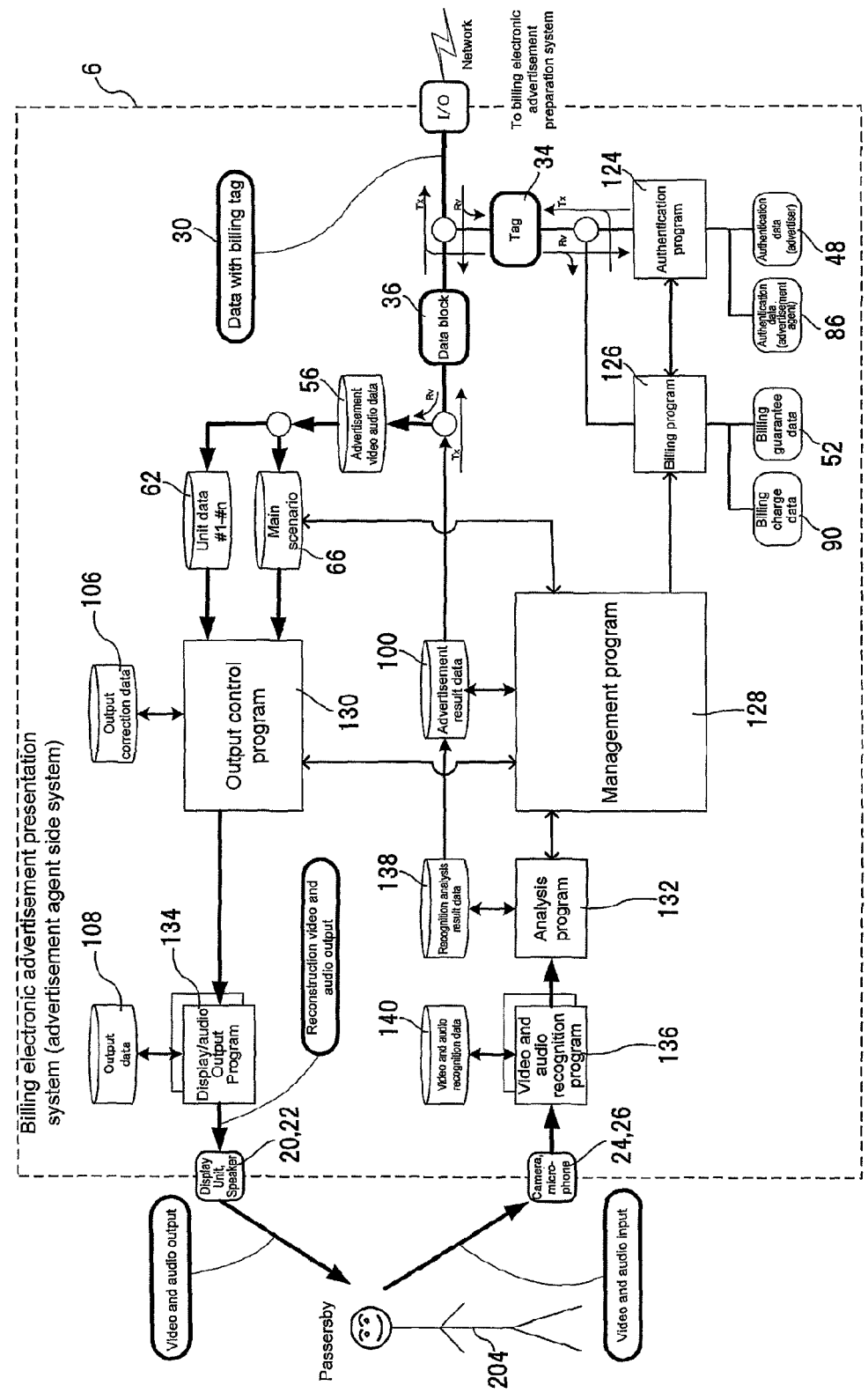
FIG. 1 is a block diagram illustrating the present invention.
Figure 2:
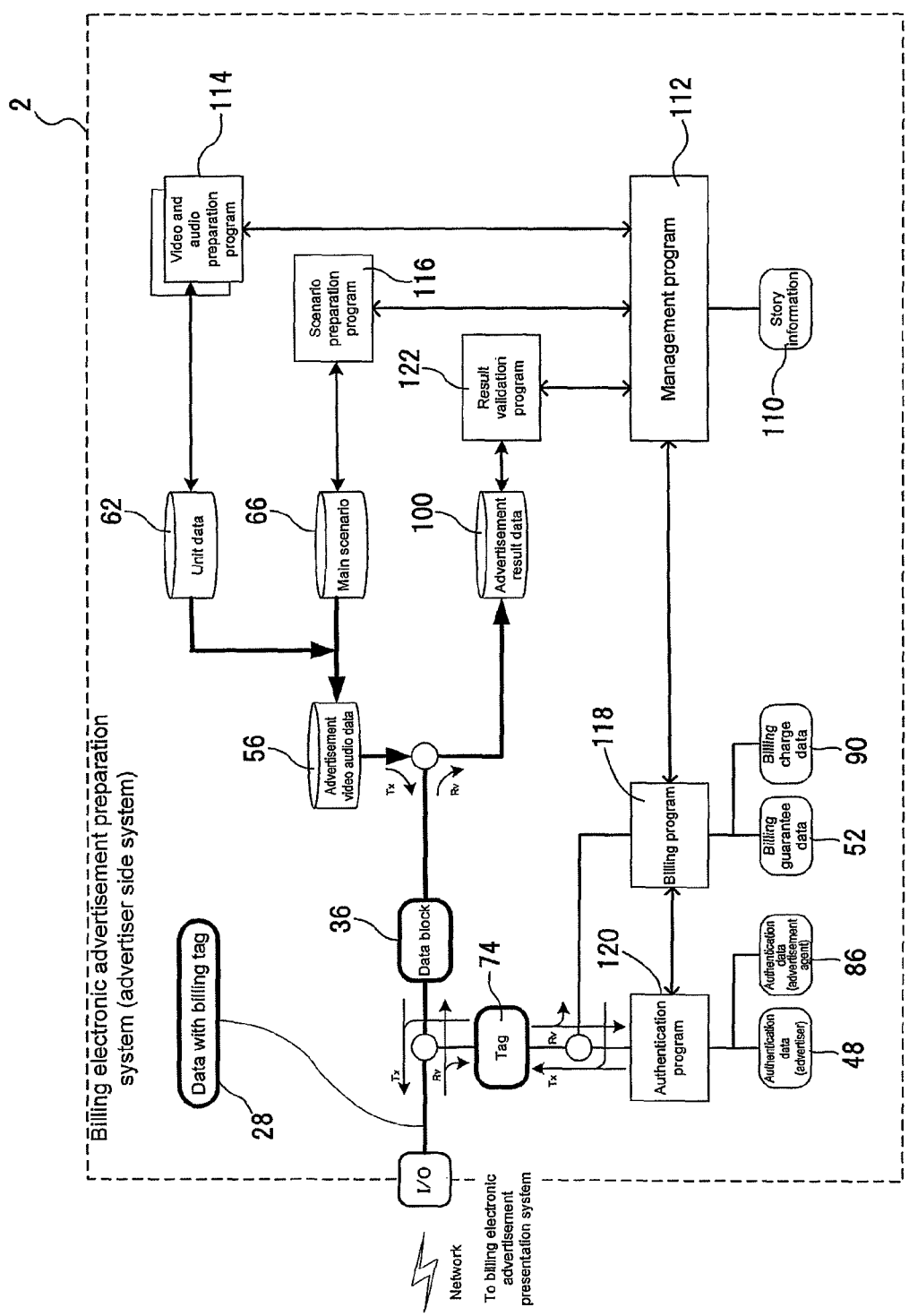
FIG. 2 is a block diagram illustrating the present invention.

FIG. 2 is a block diagram illustrating the advertising client-side (sender-side) billing electronic advertisement preparation system 2.

Figure 7:
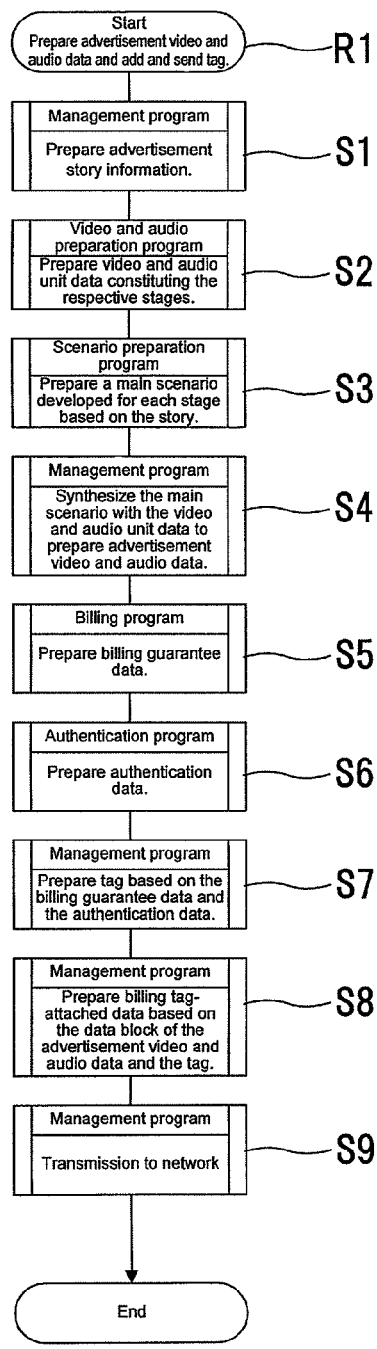
FIG. 7 is a flowchart illustrating the operation of the present invention.

The following section will describe the operation of the system 2 with reference to the flowchart shown in FIG. 7.

In FIG. 7, the advertising client-side system 2 starts the operation regarding the preparation, tag addition and transmission of advertisement video and audio data from the label R1. According to the advertising client-side system 2, a management program 112 in Step S1 prepares story information 110 based on the advertisement story information. This story information 110 is composed of a plurality of stages (process parts).

Next, in Step S2, a video and audio preparation program 114 prepares, based on the respective stages of the story information 110, the unit data 62 of the video and audio constituting the respective stages.

Next, in Step S3, a scenario preparation program 116 prepares, based on the story information 110, the main scenario 66 developed for each stage. Next, in Step S4, the management program 112 synthesizes the main scenario 66 with the video and audio unit data 62 to prepare the advertisement video and audio data 56.

Next, in Step S5, a billing program 118 prepares the billing guarantee data 52 based on the input data regarding the billing guarantee. Next, in Step S6, an authentication program 120 prepares the authentication data 48 based on the authentication-related input data. Next, in Step S7, the management program 112 prepares the tag 34 based on the billing guarantee data 52 and the authentication data 48.

Next, in Step S8, the management program 112 generates the billing tag-attached data 28 based on the advertisement video and audio data block 36 and the tag 34. Next, in Step S9, the management program 112 sends the billing tag-attached data 28 to the billing electronic advertisement notification system 6 via a network, thereby completing the transmission processing of the advertising client-side system 2.

Figure 8:
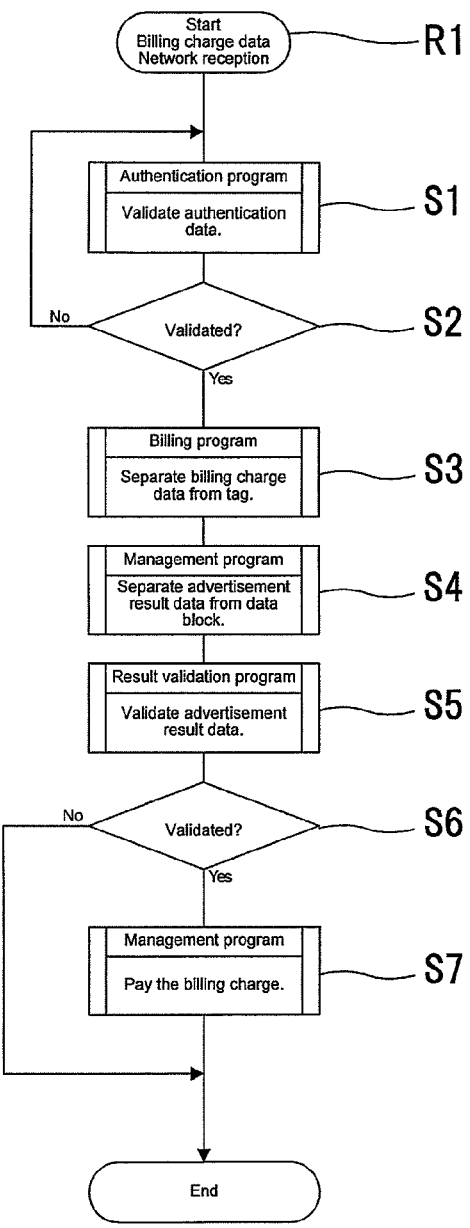
FIG. 8 is a flowchart illustrating the operation of the present invention.

FIG. 8 illustrates the billing charge data reception processing of the advertising client-side system 2.

In FIG. 8, the advertising client-side system 2 starts the network reception processing of the billing charge data from the label R2. According to the advertising client-side system 2, the authentication program 120 in Step S1 validates the authentication data 86 received from the billing electronic advertisement notification system 6.

Next, the authentication program 120 in Step S2 determines whether the authentication data 86 is validated or not. When Step S2 determines that the authentication data 86 is not validated, the processing returns to Step S1. When Step S2 determines that the authentication data 86 is validated, the billing program 118 in Step S3 separates the billing charge data 90 from the tag 74. Next, in Step S4, the management program 112 separates the advertisement result data 100 from the data block 76. Next, in Step S5, the result validation program 122 validates the advertisement result data 100. Next, the result validation program 122 in Step S6 determines whether the advertisement result data 100 is validated or not. When Step S6 determines that the advertisement result data 100 is not validated, the advertising client-side system 2 completes the processing. When the result validation program 122 determines, in Step S6 for determination, that the advertisement result data 100 is validated, then the management program 112 in Step S7 performs the calculation of the billing charge, thereby completing the processing.

Next, the following section will describe the processing operation by the advertisement agency-side system 6 to receive the billing tag-attached data with reference to the flowcharts shown in FIG. 9 to FIG. 12.

Figure 9:
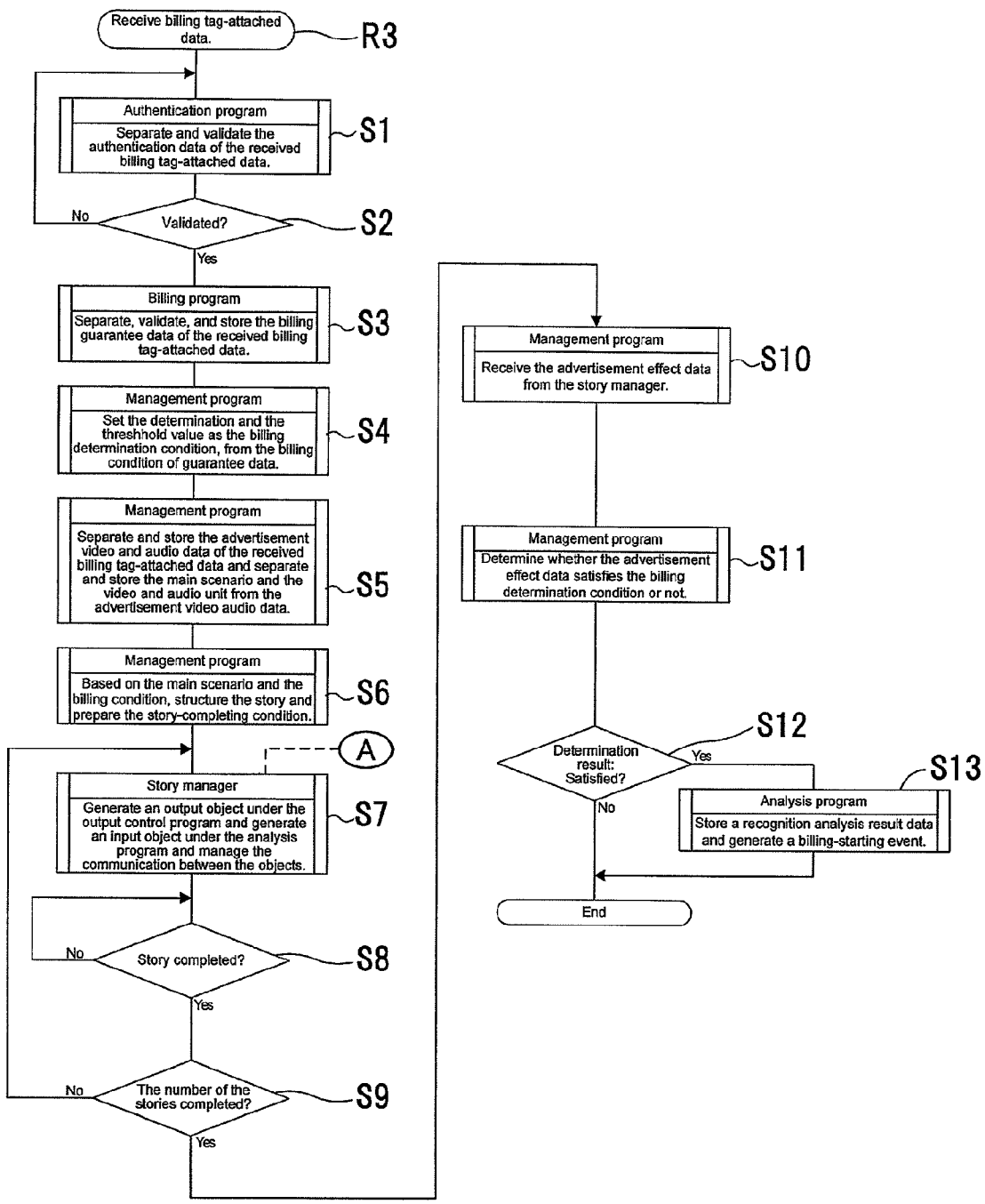
FIG. 9 is a flowchart illustrating the operation of the present invention.

In FIG. 9, the advertisement agency-side system 6 starts the processing operation of receiving the billing tag-attached data from the label R3.

When the data reception processing by the advertisement agency-side system 6 is started, an authentication program 124 in Step S1 separates and validates the authentication data 48 of the received billing tag-attached data 28. Next, in Step S2, the authentication program 124 determines whether the authentication data 48 is validated or not. When it is determined that the authentication data 48 is validated, a billing program 126 in Step S3 separates, validates, and stores the billing guarantee data 52 of the received billing tag-attached data.

Next, in Step S4, a management program 128 sets a determination item and a threshold value as a billing determination condition based on the billing condition of the billing guarantee data 52. Next, in Step S5, the management program 128 separates and stores the advertisement video and audio data 56 of the received billing tag-attached data 28 and separates the main scenario 60 and the video and audio unit data 62 from the advertisement video and audio data 56 to store the main scenario 60 and the video and audio unit data 62. Next, in Step S6, the management program 128 structures the story based on the main scenario 60 and the billing condition and prepares the condition for the number for completing the story. Next, the management program 128 in Step S7 generates, based on the unit data 62, an output object under an output control program 130 and generates, based on the video and audio input, an input object under an analysis program 132 and manages the communication between these objects. The input object is generated by subjecting the input video data of the camera 24 to a recognition analysis. A method of generating an output object or an input object based on output data or input data is a conventionally-known program technique (see Patent Publication 2). In this embodiment, the conventionally-known program generating technique is used. The program part in the management program 128 responsible for the generation and control of an object will be conveniently called a story manager.

Figure 10:
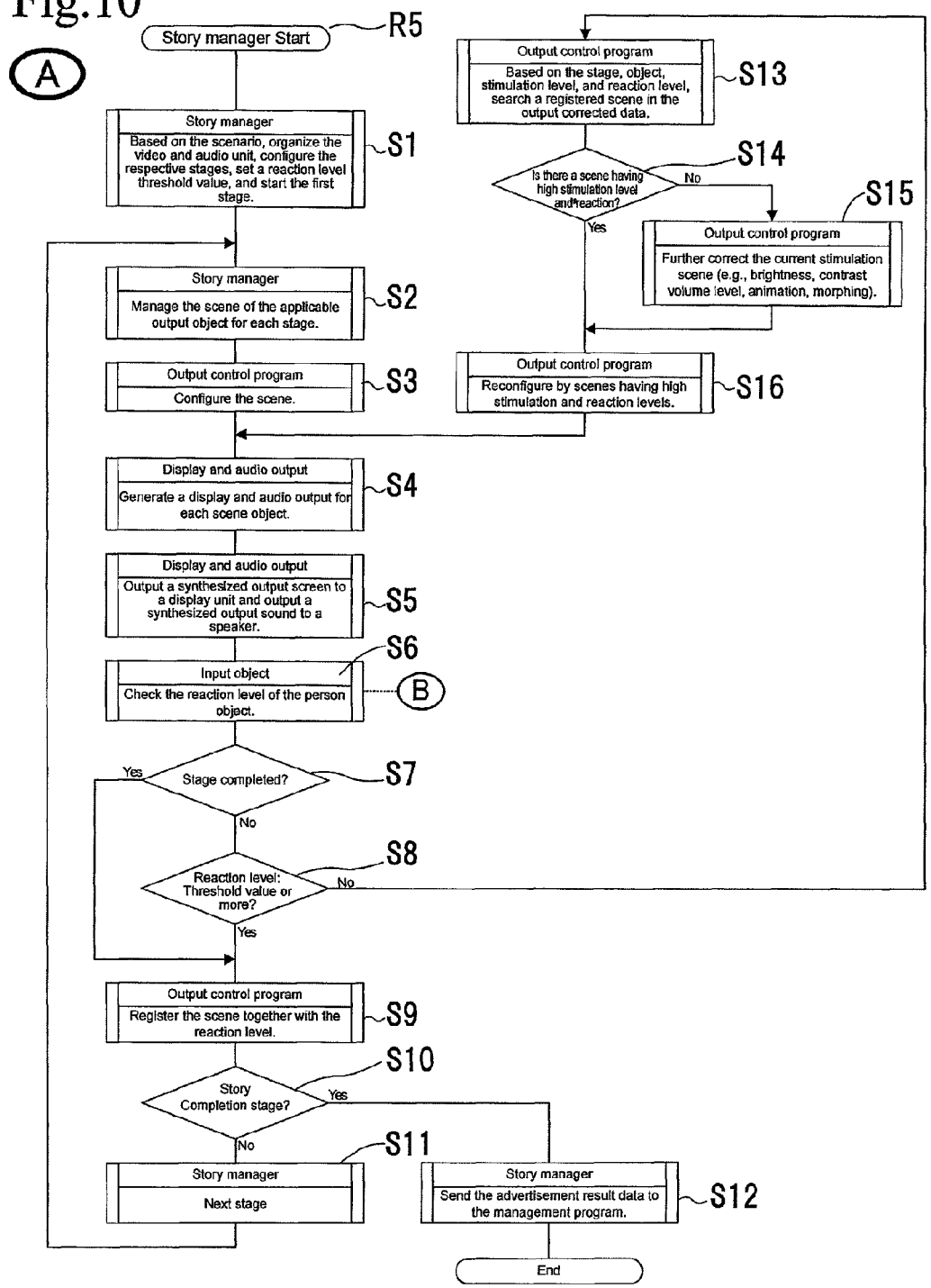
FIG. 10 is a flowchart illustrating the operation of the present invention.

The following section will describe in detail the processing in Step S7 with reference to the flowchart shown in FIG. 10. Step S7 shown in FIG. 9 is started from the label R5 of FIG. 10. In Step S1, the management program 128 organizes, based on the scenario, the video and audio unit 62 to configure the respective stages and to set a reaction level threshold value, thereby starting the first stage. Next, Step S2 manages the scene of the output object applicable to each stage. Next, in Step S2, the output control program 130 configures the scene. Next, in Step S3, a display and audio output program 134 generates a display and audio output for each object of the scene. Next, in Step S5, the display and audio output program 134 outputs a synthesized screen to the display unit 22 and outputs synthesized output sound to the speaker 20.

Next, in Step S6, the management program 128 checks the reaction level of the person object (input object) generated in the analysis program 132. The term "reaction level" means, as shown in an embodiment (which will be described later), the number of persons turned to the advertisement or the number of smiling faces for example. Next, in Step S7, the output control program 130 determines whether the stage is completed or not. When it is determined that the stage is completed, the processing proceeds to Step S9. When it is determined in Step S7 that the stage is not completed, Step S8 determines whether the reaction level is equal to or higher than a threshold value or not. When it is determined that the reaction level is equal to or higher than the threshold value, then the processing proceeds to Step S9. When Step S8 determines that the reaction level is not equal to or higher than the threshold value, the output control program 130 in Step S13 searches a registered scene in the output correction data 106 based on the stage, object, stimulation level, and reaction level.

Next, in Step S14, the output control program 130 determines whether the output correction data 106 includes therein a scene having high stimulation level and reaction level or not. When it is determined that the output correction data 106 does not include therein a scene having high stimulation level and reaction level, then the current stimulation scene is further significantly corrected by changing the brightness, contrast, volume level, or animation morphing for example. Then, the processing proceeds to Step S16. When Step S14 determines that the output correction data 106 includes therein a scene having high stimulation level and reaction level, then the output control program 130 in Step S16 restructures the story by the scenes having high stimulation level and reaction level. Then, the processing proceeds to Step S4. When Step S8 determines that the reaction level is equal to or higher than the threshold value, the output control program 130 registers the scene together with the reaction level as the output correction data 106. Next, in Step S10, the output control program 130 determines whether the story is at an ending stage or not. When it is determined that the story is not at an ending stage, Step S11 starts the next stage. Then, the processing proceeds to Step S2. When Step S10 determines that the story is at an ending stage, Step S12 generates the advertisement effect data 100 (i.e., a log including the number of person objects turned to the advertisement and the number of smiling faces) to send this to the management program 128, thereby completing the processing. The above operation in Step S6 to check the reaction level of the person object is performed by executing the face recognition and the face tracking in parallel.

Figure 11:
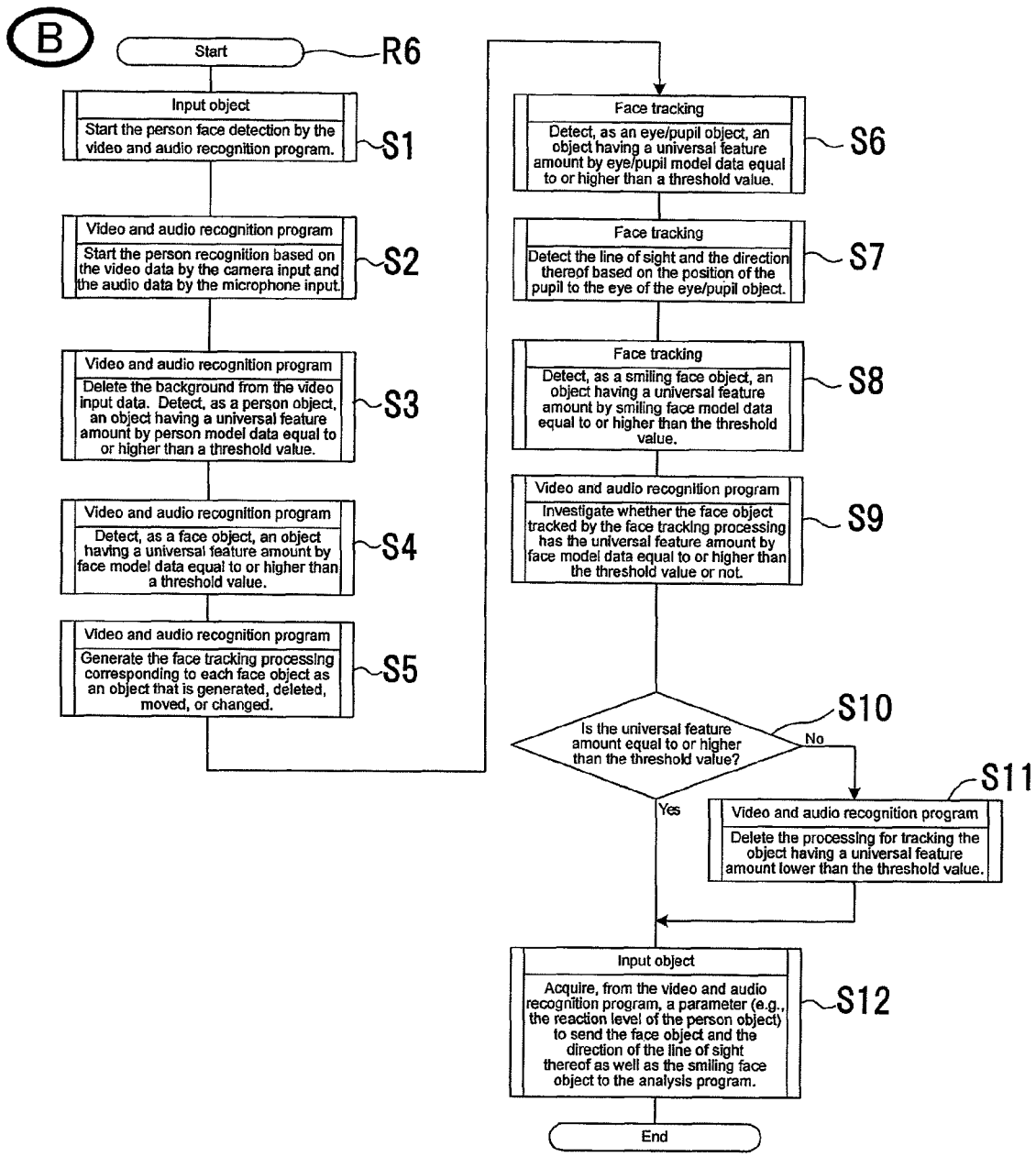
FIG. 11 is a flowchart illustrating the operation of the present invention.

Next, the following section will describe the operations for the face recognition and the face tracking processing with reference to the flowchart shown in FIG. 11.

When the face recognition and tracking processing is started from the label R6, then the person face detection processing is started by a video and audio recognition program 136 (Step S1). Next, in Step S2, the video and audio recognition program 136 starts the person recognition processing based on the video data by the camera input and the audio data by the microphone input. Next, Step S3 deletes the background from the video input data and detects, as a person object, such an object that has a universal feature amount by the person model data equal to or higher than the threshold value. Next, Step S4 detects, as a face object, such an object that has a universal feature amount by the face model data equal to or higher than the threshold value.

Next, Step S5 generates the face tracking processing corresponding to the face object as an object that is generated, deleted, moved, or changed. In Step S6, this parallel face tracking processing detects, as an eye/pupil object, such an object that has a universal feature amount by the eye/pupil model data equal to or higher than the threshold value. Next, the face tracking processing in Step S7 detects the line of sight and the direction thereof based on the position of the pupil to the eye in the eye/pupil object. Next, in Step S8, the face tracking processing detects, as a smiling face object, such an object that has a universal feature amount by smiling face model data equal to or higher than the threshold value. Next, in Step S9, the video and audio recognition program 136 investigates whether the face object tracked by the face tracking processing has the universal feature by face model data equal to or higher than the threshold value or not. In Step S10, the video and audio recognition program 136 determines whether the face object has a universal feature amount equal to or higher than the threshold value or not. When it is determined that the face object does not have a universal feature amount equal to or higher than the threshold value, then Step S11 deletes the processing for tracking the object having a universal value lower than the threshold value. Then, the processing proceeds to Step S12.

When Step S10 determines that the face object has a universal feature amount equal to or higher than the threshold value, the management program 28 in Step S12 acquires, from the video and audio recognition program, a parameter (e.g., the reaction level of the person object) to send the face object and the direction of the line of sight thereof as well as the smiling face object to the analysis program 132, thereby completing the processing.

Next, with reference to FIG. 9 again, the processings after Step S8 will be described. When the management program 128 in Step S8 determines that the story is completed, then Step S9 determines whether the number of the stories is completed or not. When it is determined that the number of the stories is not completed, the processing returns to Step S7. When it is determined that the number of the stories is completed, the processing proceeds to Step S10.

In Step S10, the management program 128 receives the advertisement result data 100 from the story manager and determines, in Step S11, whether the advertisement result data 100 satisfies the billing condition (e.g., the number M of persons turned to the advertisement, the number N of smiling faces) or not. Next, Step S12 determines whether the determination result is satisfactory or not. When it is determined that the determination result is satisfactory, the analysis program 132 in Step S13 stores, based on video and audio recognition data 140, analyzed recognition analysis result data 138 to generate a billing-starting event. When Step S12 determines that the determination result is not satisfactory, the processing is completed.

Figure 12:
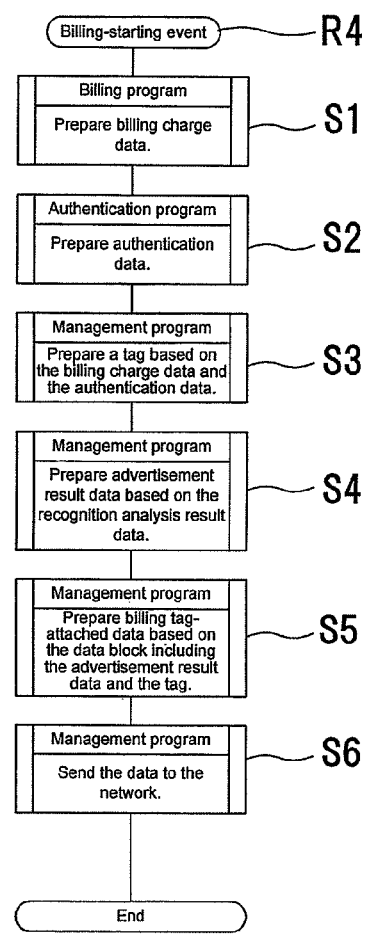
FIG. 12 is a flowchart illustrating the operation of the present invention.

Next, with reference to FIG. 12, the following section will describe the billing tag-attached data transmission processing of the advertisement agency-side system 6.

When the billing-starting event is started from the label R4, the billing program 126 in Step S1 prepares billing charge data 90. Next, in Step S2, the authentication program 124 prepares the authentication data 86. Next, in Step S3, the management program 128 prepares the tag 74 based on the billing charge data 90 and the authentication data 86. Next, in Step S4, the management program 128 prepares the advertisement result data 100 based on the recognition analysis result data 138. Next, in Step S5, the management program 128 generates the billing tag-attached data 30 based on the data block 76 including the advertisement result data 100 and the tag 74. Next, in Step S6, the management program 128 sends the billing tag-attached data 30 via a network to the advertising client-side billing electronic advertisement preparation system 2, thereby completing the processing.

Next, the following section will describe an embodiment of an object generated by the management program 128 with reference to FIG. 13 to FIG. 16.

As shown in Step S7 of FIG. 9, an output object is generated under the output control program 130 and an input object is generated under the analysis program 132. In the embodiment shown in FIG. 13 to FIG. 16, a sales copy object 142 (see FIG. 17), a baby object 144, a background BGM object 146, and a mother object 148 are generated as this output object. A passersby (person) object 150 is generated as the input object.

The processings shown in FIG. 13 to FIG. 16 are executed in parallel.

Figure 13:
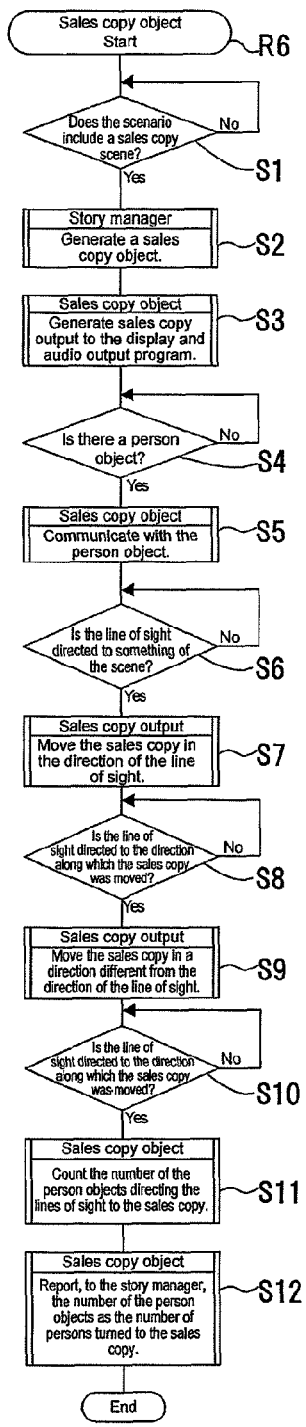
FIG. 13 is a flowchart illustrating the operation of the present invention.

First, when the processing for a sales copy object shown in the label 6 of FIG. 13 is started, the management program 128 in Step S1 determines whether the scenario includes a sales copy scene or not. When it is determined that the scenario includes a sales copy scene, the story manager in Step S2 generates the sales copy object 142. Next, in Step S2, a sales copy output is generated to the display and audio output program 134. Next, in Step S4, the management program 128 determines whether there is the person object (passerby object) 150 or not. When it is determined that there is the person object (passerby object) 150, Step S5 communicates with the person object 150. Next, Step S6 determines whether the line of sight of the person object 150 was directed to something or not. When it is determined that the line of sight of person object 150 was directed to something, then Step S7 moves the sales copy 142 in the direction of the line of sight.

Next, Step S8 determines whether the line of sight of the person object 150 was directed to the direction along which the sales copy 142 was moved or not. When it is determined that the line of sight of the person object 150 was directed to the direction along which the sales copy 142 was moved, then Step S9 moves the sales copy 142 in a direction different from the direction of the line of sight of the person object 150. Next, Step S10 determines whether the line of sight is directed to the direction along which the sales copy 142 was moved or not. When it is determined that the line of sight is directed to the direction along which the sales copy 142 was moved, Step S11 counts the number of the person objects 150 directing the lines of sight to the sales copy 142. Next, Step S12 reports, to the story manager, the number of the person objects as the number of persons turned to the sales copy.

Figure 14:
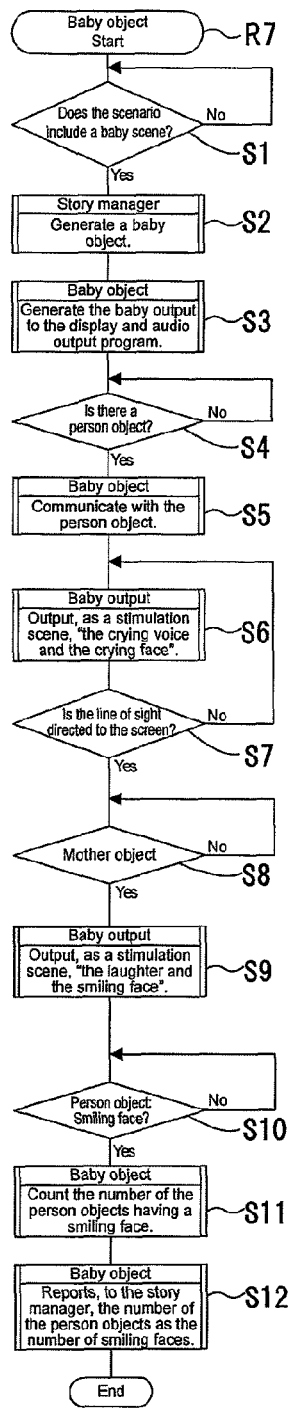
FIG. 14 is a flowchart illustrating the operation of the present invention.

In FIG. 14, the label 7 shows the processing for the baby object. When this processing is started, Step S1 determines whether the scenario includes a baby scene or not. When it is determined that the scenario includes a baby scene, then Step S2 generates the baby object 144. Next, Step S3 generates a baby output to the display and audio output program 134. Next, Step S4 determines whether there is the person object 150 or not. When it is determined that there is the person object 150, then Step S5 communicates with the person object 150. Next, Step S6 outputs, as a stimulation scene, "the crying voice and the crying face" of the baby to the screen. Next, Step S7 determines whether the line of sight of the person object was directed to the screen or not. When it is determined that the line of sight of the person object was directed to the screen, Step S8 determines whether there is a mother object or not. When it is determined that there is a mother object, Step S9 outputs, as a stimulation scene, "the laughter and the smiling face" of the baby to the screen.

Next, Step S10 determines whether the person object 150 is a smiling face or not. When it is determined that the person object 150 is a smiling face, the number of the person objects 150 of smiling faces is counted. Next, Step S12 reports, to the story manager, the number of the person objects 150 of smiling faces as the number of smiling faces.

Figure 15:
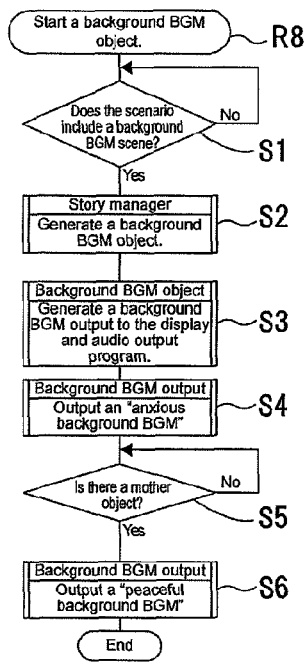
FIG. 15 is a flowchart illustrating the operation of the present invention.

In FIG. 15, the label R8 shows the processing for the background BGM object. When this processing is started, Step S1 determines whether the scenario includes a background BGM scene or not. When it is determined that the scenario includes a background BGM scene, then Step S2 generates the background BGM object 146. Next, Step S3 generates a background BGM output to the display and audio output program 134. Next, Step S4 outputs an "anxious background BGM" 152. Next, Step S5 determines whether there is the mother object 148 or not. When it is determined that there is the mother object 148, then Step S6 outputs a "peaceful background BGM" 176.

Figure 16:
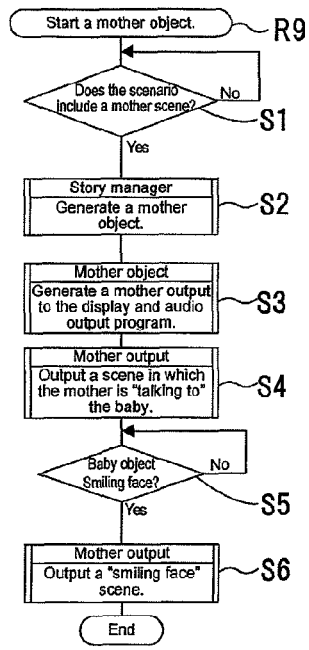
FIG. 16 is a flowchart illustrating the operation of the present invention.
Figure 17:
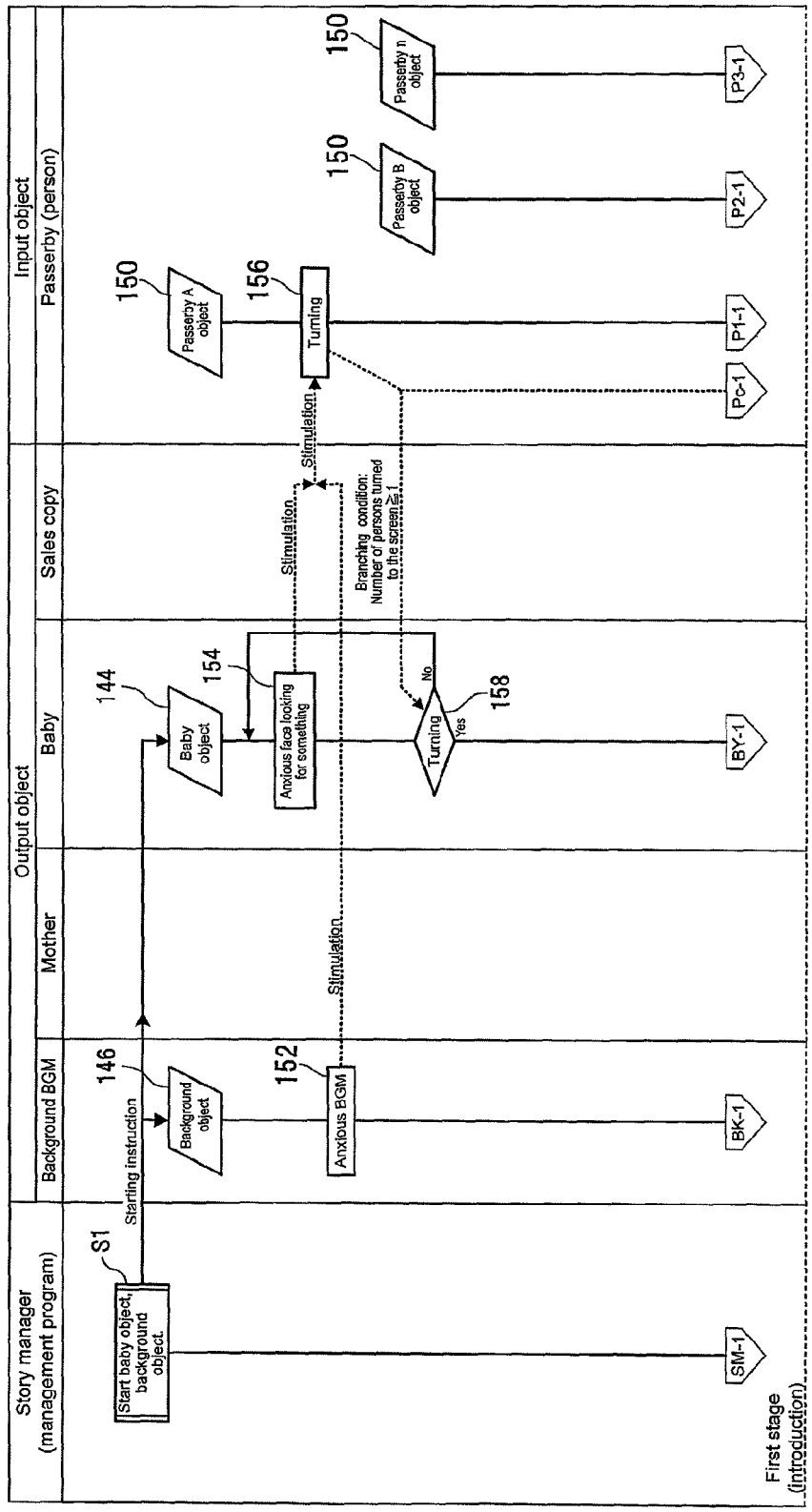
FIG. 17 illustrates the present invention.

In FIG. 16, the label R9 shows the processing for a mother object. When this processing is started, Step S1 determines whether the scenario includes a mother scene or not. When it is determined that the scenario includes a mother scene, then Step S2 generates the mother object 148. Next, Step S3 generates a mother output to the display and audio output program 134. Next, Step S4 outputs a scene in which the mother is "talking to" the baby. Next, Step S5 determines whether the baby object 144 is a smiling face or not. When it is determined that the baby object 144 is a smiling face, then Step S6 outputs the "smiling face scene" of the baby.

FIG. 17 to FIG. 20 illustrate the operation of the management program of the advertisement agency-side system. The advertisement video and audio output is configured by a plurality of stages. In the first stage of FIG. 17, Step S1 outputs the baby object 144 and the background object 146. The background object 146 is composed of the anxious BGM 152. The baby object 144 is composed of an anxious face searching for something 154. When the screen composed of the combination of the anxious BGM 152 and the anxious face searching for something 154 of the baby object 144 causes the object 150 of the passerby A to turn to the direction of the screen of the display unit, this turning behavior 156 is determined by a determination block 158 by the communication between objects. When the object 150 of the passerby A does not turn to the screen, then the anxious face searching for something 154 of the baby is continuously outputted.

Figure 18:
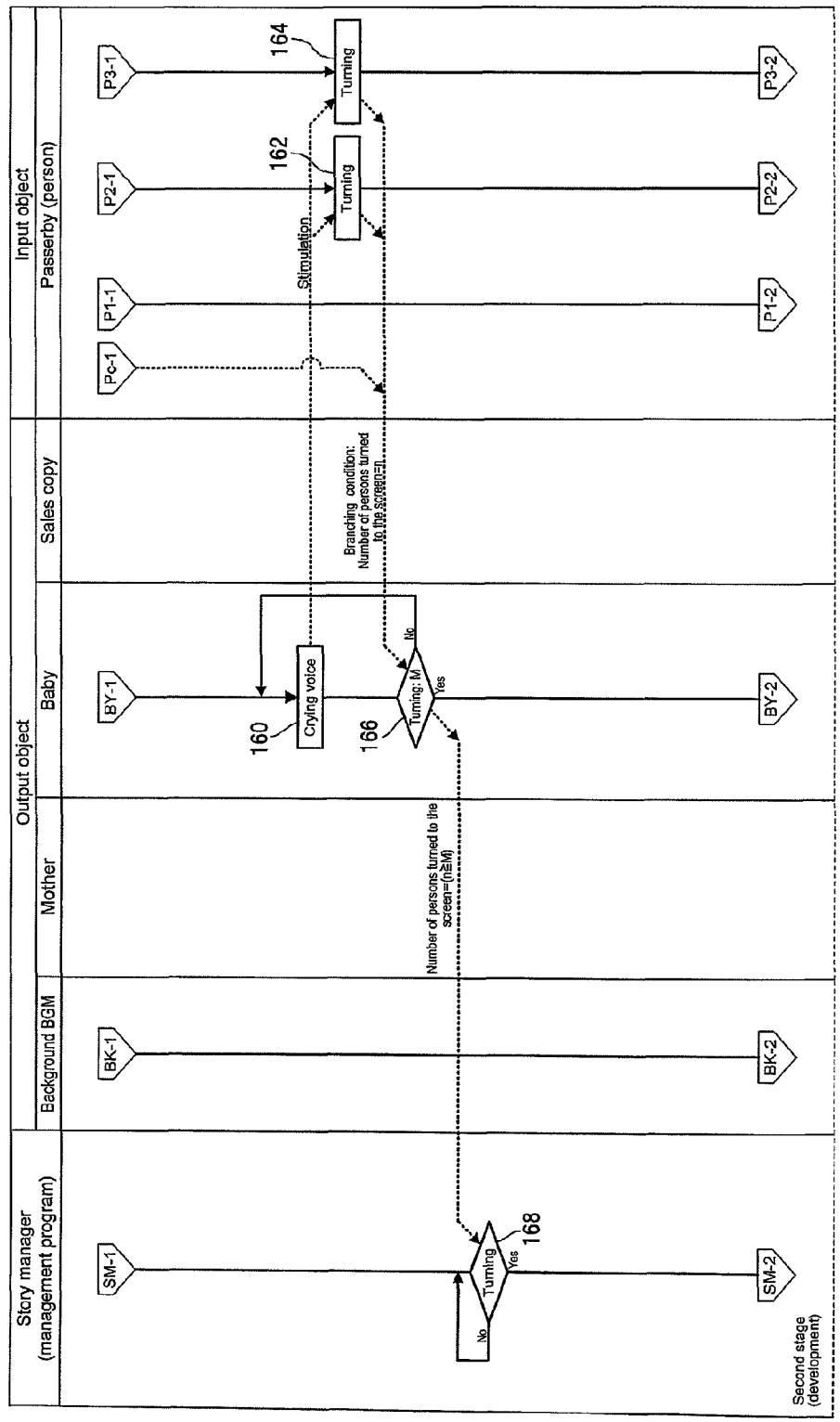
FIG. 18 illustrates the present invention.
Figure 19:
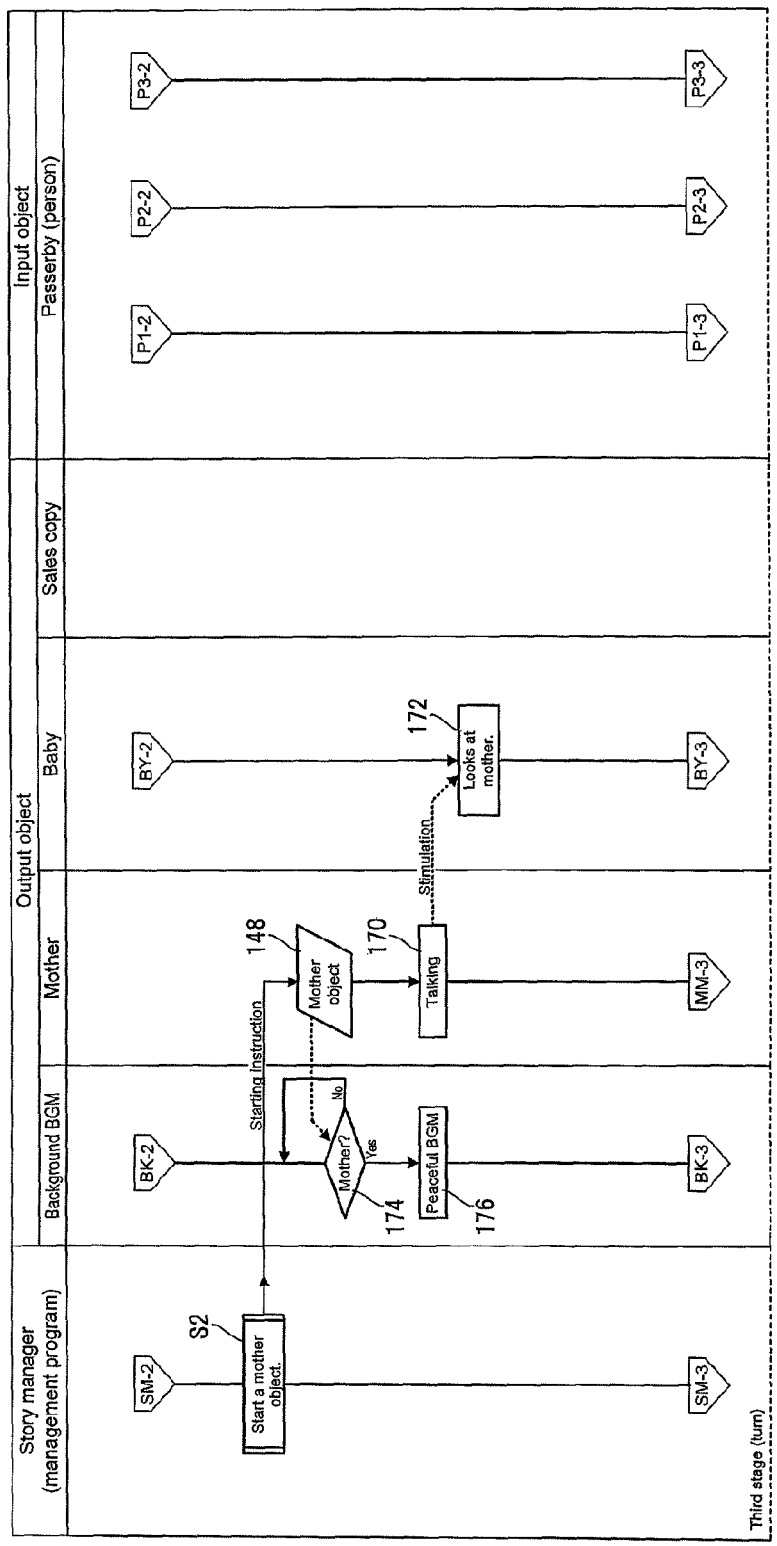
FIG. 19 illustrates the present invention.
Figure 20:
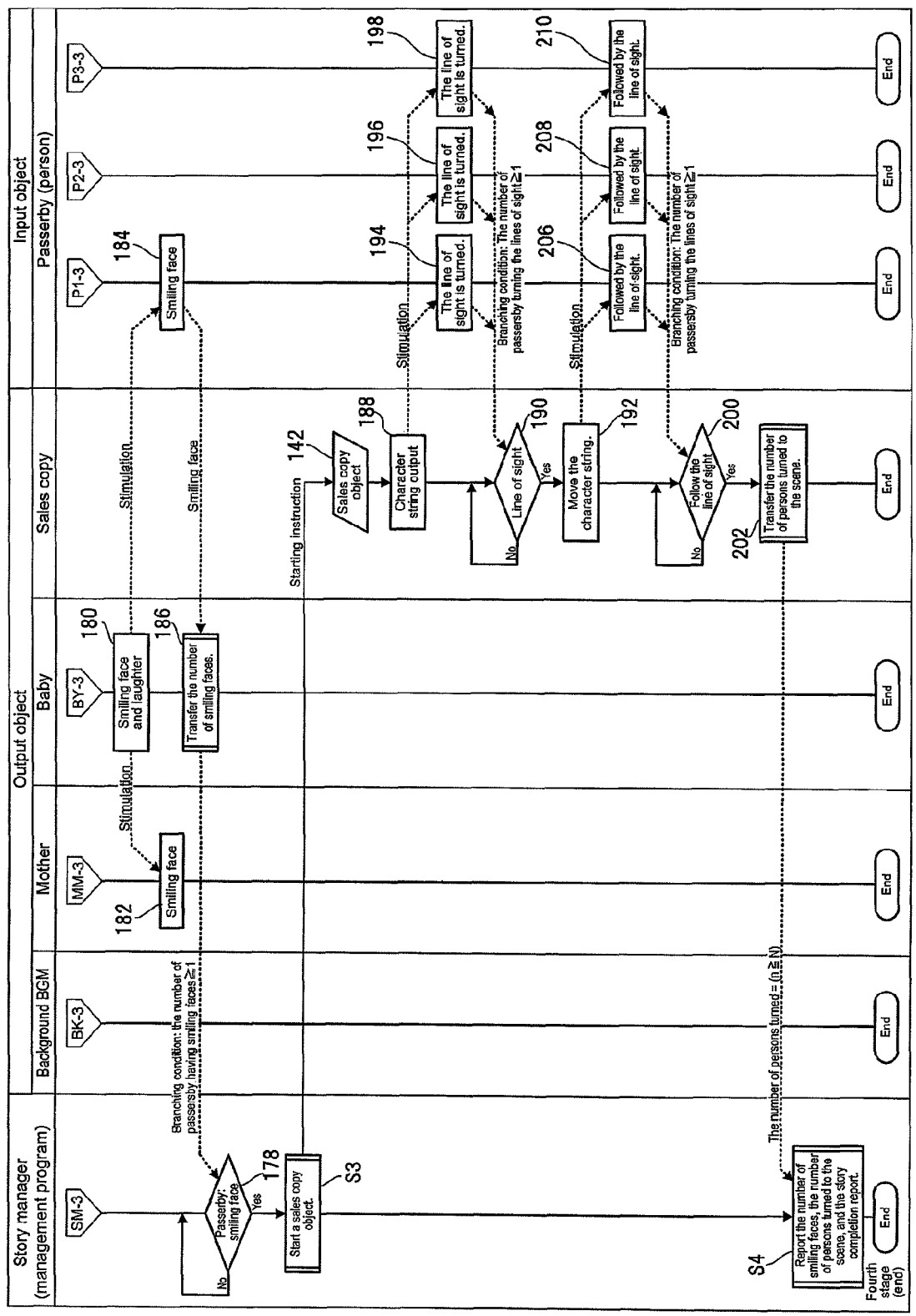
FIG. 20 illustrates the present invention.

When the determination block 158 determines that the object 150 of the passerby A turned to the screen, the processing proceeds to the second stage shown in FIG. 18. The baby object 144 changes to a crying voice video 160. When this crying voice video 160 causes the object 150 of the passerby B and the object 150 of the passerby n to change to turning behaviors 162 and 164 toward the screen, the number of the objects 150 of the passersby is recognized by determination blocks 166 and 168. In the third stage shown in FIG. 19, Step S2 starts a mother object generation processing. Then, the scene of "talking to" behavior 170 of the mother object 148 to the baby object 144 is outputted.

After this "talking" scene, the screen shows a scene of "looking at the mother" behavior 172 of the baby object 144. When a determination block 174 determines that the mother object 148 appears in the screen, then the "peaceful BGM" 176 is outputted to the screen. In the fourth stage shown in FIG. 20, the smiling face and laughter behavior 180 of the baby object 144 stimulates the mother object 148 and the mother object 148 consequently shows smiling face behavior 182. When this stimulation causes the object 150 of the passerby A to change to smiling face behavior 184, then this behavior is sent as the number of smiling faces by a transfer processing 186 to a determination block 178. Then, this behavior is determined as the number 1 of smiling faces of the passersby.

When the determination block 178 determines that the passersby show a smiling face, then Step S3 starts the sales copy object generation processing. Then, the character string of the sales copy object 142 is outputted to the screen (block 188). A determination block 190 determines whether the lines of sight of the objects 150 of the passersby A, B, and n turned to a character string output 188 or not based on "lines of sight turning" behaviors 194, 196, and 198 of the respective passerby objects 150. When the number of the passerby objects 150 for which the line of sight turned to the character string output 188 is confirmed, then a moving operation 192 of the character string is performed. How many lines of sight of the passerby objects 150 follow the character string-moving operation is determined by a determination block 200 based on "line of sight following" behaviors 206, 208, and 210 of the respective passerby objects 150. Then, this number is transferred by transfer processing 202, as the number of the passersby turned to the screen, to the processing of Step S4. In Step S4, the story manager reports, based on the transferred data, the number of smiling faces and the number of passersby turned to the advertisement of the passerby objects 150 to the management program 128 and reports the completion of the story, thereby completing the fourth stage.

In the above embodiment, data prepared by the advertising client-side system is sent via a network to the advertisement agency-side reception system. However, this embodiment is not particularly limited. Thus, a so-called offline configuration also may be used in which data prepared by the advertising client-side system is directly inputted to the storage apparatus of the advertisement agency-side system via a recording medium.

In the above embodiment, billing data is sent from the advertisement agency-side system via a network to the advertising client-side system. A so-called offline configuration also may be used in this case in which a recording medium in which billing data is recorded is directly inputted to the advertising client-side system. Specifically, the data communication between the computer of the advertising client-side system and the computer of the advertisement agency-side system may be performed on an offline basis.

The billing condition is not limited to the one shown in this embodiment. Another billing condition also may be used by using the audio data of the microphone 26 to find the number of passersby reacting to the display unit 20 by uttering a sound. Another billing condition also may be arbitrarily set by the advertising client side.

DESCRIPTION OF THE REFERENCE NUMERALS

2: Billing electronic advertisement preparation system
4: Work station
6: Billing electronic advertisement notification system
8: Network interface
10: Hard disk
12: Memory
14: CPU
16: Internal bus
18: I/O interface
20: Speaker
22: Video display unit
24: Video camera
26: Microphone
28: Tag-attached data
30: Tag-attached data
32: Unique word
34: Tag
36: Data block
38: Header
40: Authentication data portion
42: Unique word
44: Tag
46: Data block
48: Authentication data portion
50: Billing charge data portion
52: Tag check code
54: Header
56: Authentication data
58: Header
60: Billing charge data
62: Header
64: Advertisement result data portion
66: Data block check code
68: Header
70: Data
72: Unique word
74: Tag
76: Data block
78: Authentication data portion
80: Billing charge data portion
82: Tag check code
84: Header
86: Authentication data
88: Header
90: Billing charge data
92: Header
94: Advertisement result data
96: Data block check code
98: Header
100: Advertisement result data 102: Video and audio recognition data
104: Recognition analysis result data
106: Output correction data
108: Output data
110: Story information
112: Management program
114: Video and audio preparation program
116: Scenario preparation program
118: Billing program
120: Authentication program
122: Result validation program
124: Authentication program
126: Billing program
128: Management program
130: Output control program
132: Analysis program
134: Display and audio output program
136: Video and audio recognition program
138: Recognition analysis result data
140: Video and audio recognition data
142: Sales copy object
144: Baby object
146: Background BGM object
148: Mother object
150: Passersby object
152: Anxious BGM
154: Anxious face searching for something
156: Turning behavior
158: Determination block
160: Crying voice video
162: Turning behavior
164: Turning behavior
166: Determination block
168: Determination block
170: "Talking to" behavior
172: "Looking at mother" behavior
174: Determination block
176: Peaceful BGM
178: Determination block
180: Smiling face and laughter behavior
182: Smiling face behavior
184: Smiling face behavior
186: Transfer processing
188: Block
190: Determination block
192: Moving operation
194: Line of sight turning behavior
196: Line of sight turning behavior
198: Line of sight turning behavior
200: Determination block
202: Transfer processing
204: Passerby
206: Line of sight following behavior
208: Line of sight following behavior
210: Line of sight following behavior

What is claimed is:

1. A billing electronic advertisement system, comprising:
an electronic advertisement sending side computer including therein an electronic advertisement preparation program;
a receiving side computer that includes therein a program for processing electronic advertisement data generated by the electronic advertisement sending side computer and that outputs, via a display unit, video and audio of the electronic advertisement data processed by the receiving side computer as output data; and
an electronic device that inputs a circumstance around the display unit as input data to the receiving side computer,
wherein the electronic advertisement preparation program included in the electronic advertisement sending side computer includes a billing tag addition means for adding, to the electronic advertisement data, a tag including information describing billing conditions,
wherein the program included in the receiving side computer includes an input video analysis means that analyzes and determines whether or not the billing conditions for outputted electronic advertisement data are achieved by analyzing the input data of the electronic device,
wherein, when the input video analysis means analyzes and determines that the billing conditions are achieved, the program included in the receiving side computer generates billing charge data to be processed by the electronic advertisement sending side computer, and
wherein the electronic device includes a camera that photographs the circumstance around the display unit, such that the input data includes a photograph of the circumstance around the display unit.

2. The billing electronic advertisement system according to claim 1, wherein the electronic advertisement sending side computer is connected to the receiving side computer via a network.

3. The billing electronic advertisement system according to claim 1, wherein the electronic advertisement data generated by the electronic advertisement sending side computer is supplied via a recording medium to the receiving side computer and, the billing charge data generated by the receiving side computer is supplied via a recording medium to the electronic advertisement sending side computer.

4. The billing electronic advertisement system according to claim 1, wherein the billing conditions include, as contents thereof, at least one of numeric values of a number of passersby turned to an advertisement output screen and a number of passersby smiled at the advertisement output screen.

5. The billing electronic advertisement system according to claim 1, wherein the electronic advertisement data includes a unique word, authentication data composed of an ID code of a transmitter and an ID code of a recipient, billing guarantee data including a billing amount and the billing conditions, and advertisement video audio data including a main scenario and a plurality of pieces of unit data.

6. The billing electronic advertisement system according to claim 1, wherein the input video analysis means includes an information analysis function for preparing electronic information by recognizing, based on video information of the electronic device, directions of faces or facial expressions of persons surrounding the display unit.

7. The billing electronic advertisement system according to claim 1, wherein the program included in the receiving side computer reconfigures, based on an analysis result of the input video analysis means, a scenario of the electronic advertisement data so as to achieve the billing conditions and outputs the video and audio of the reconfigured scenario of the electronic advertisement data through the display unit.

8. The billing electronic advertisement system according to claim 1, wherein when the electronic advertisement preparation program included in the electronic advertisement sending side computer receives the billing charge data, the electronic advertisement preparation program validates whether or not the billing conditions are achieved and, when the billing conditions are achieved, calculates a billing charge.

9. The billing electronic advertisement system according to claim 1, wherein the electronic advertisement preparation program included in the electronic advertisement sending side computer generates an output object based on the output data, generates an input object based on the input data and, when the input object does not change in a direction satisfying the billing conditions, reconfigures a scene including the output object and uses the reconfigured scene to guide the input object in the direction satisfying the billing conditions.

10. The billing electronic advertisement system according to claim 9, wherein when the input object is guided by the output object in the direction satisfying the billing conditions, the scene is recorded as corrected output data and the corrected output data is used to reconfigure the scene.

11. The billing electronic advertisement system according to claim 1, wherein the electronic device includes a microphone that records audio data of the circumstance around the display unit, such that the input data includes the audio data of the circumstance around the display unit.

* * * * *